(12) United States Patent
Barchasz et al.

(10) Patent No.: US 9,331,359 B2
(45) Date of Patent: May 3, 2016

(54) LITHIUM ELECTROCHEMICAL ACCUMULATOR HAVING A SPECIFIC BIPOLAR ARCHITECTURE

(75) Inventors: Celine Barchasz, Fontaine (FR); Marianne Chami, Fontaine (FR); Sebastien Martinet, St Quentin/Isere (FR); Sebastien Patoux, Saint Nicolas de Macherin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 13/704,643

(22) PCT Filed: Jun. 15, 2011

(86) PCT No.: PCT/EP2011/059973
§ 371 (c)(1),
(2), (4) Date: Dec. 31, 2012

(87) PCT Pub. No.: WO2011/157768
PCT Pub. Date: Dec. 22, 2011

(65) Prior Publication Data
US 2013/0101903 A1    Apr. 25, 2013

(30) Foreign Application Priority Data
Jun. 17, 2010    (FR) ..................................... 10 54818

(51) Int. Cl.
*H01M 10/052* (2010.01)
*H01M 2/26* (2006.01)
(Continued)

(52) U.S. Cl.
CPC .............. *H01M 10/052* (2013.01); *H01M 2/26* (2013.01); *H01M 4/134* (2013.01); *H01M 4/136* (2013.01); *H01M 4/38* (2013.01); *H01M 4/382* (2013.01); *H01M 4/581* (2013.01); *H01M 4/5815* (2013.01); *H01M 4/661* (2013.01); *H01M 10/0566* (2013.01); *H01M 10/0569* (2013.01); *H01M 2004/029* (2013.01); *H01M 2300/0025* (2013.01); *Y02E 60/122* (2013.01); *Y02T 10/7011* (2013.01)

(58) Field of Classification Search
CPC ......................... H01M 10/0569; H01M 4/5815
USPC .................................................. 429/188, 329
See application file for complete search history.

(56) References Cited

U.S. PATENT DOCUMENTS 5,162,172 A    11/1992  Kaun
5,254,415 A    10/1993  Williams et al.
(Continued)

FOREIGN PATENT DOCUMENTS

EP    1487034 A2    12/2004
EP    2003715 A2    12/2008
(Continued)

*Primary Examiner* — Nicholas P D'Aniello
(74) *Attorney, Agent, or Firm* — Hultquist, PLLC; Mary B. Grant

(57) ABSTRACT

The invention relates to an electrochemical lithium accumulator comprising at least one first electrochemical cell and at least one second electrochemical cell separated from each other by a current-collecting substrate, which substrate supports on a first face, an electrode of said first electrochemical cell, and on its second face opposite to said first face, an electrode of opposite sign of said second electrochemical cell, each cell comprising a positive electrode and a negative electrode separated by an electrolyte, characterized inter alia in that said current-collecting substrate is in copper or in copper alloy.

19 Claims, 1 Drawing Sheet

(51) Int. Cl.
*H01M 4/134* (2010.01)
*H01M 4/136* (2010.01)
*H01M 4/38* (2006.01)
*H01M 4/58* (2010.01)
*H01M 4/66* (2006.01)
*H01M 10/0566* (2010.01)
*H01M 10/0569* (2010.01)
*H01M 4/02* (2006.01)

(56) References Cited

U.S. PATENT DOCUMENTS

| | | |
|---|---|---|
| 5,432,028 A | 7/1995 | Barlow |
| 5,432,030 A | 7/1995 | Vourlis |
| 6,911,280 B1 | 6/2005 | De Jonghe et al. |
| 2002/0037457 A1 | 3/2002 | Choi |
| 2003/0054245 A1* | 3/2003 | Barton et al. .................. 429/212 |
| 2005/0221168 A1* | 10/2005 | Dahn et al. ..................... 429/105 |
| 2005/0284750 A1* | 12/2005 | Nishimura .............. H01M 2/34 |
| | | 204/252 |
| 2009/0159582 A1 | 6/2009 | Chami et al. |

FOREIGN PATENT DOCUMENTS

| | | |
|---|---|---|
| EP | 2073300 A2 | 6/2009 |
| FR | 2713403 A1 | 6/1995 |
| WO | 2006061696 A2 | 6/2006 |

* cited by examiner

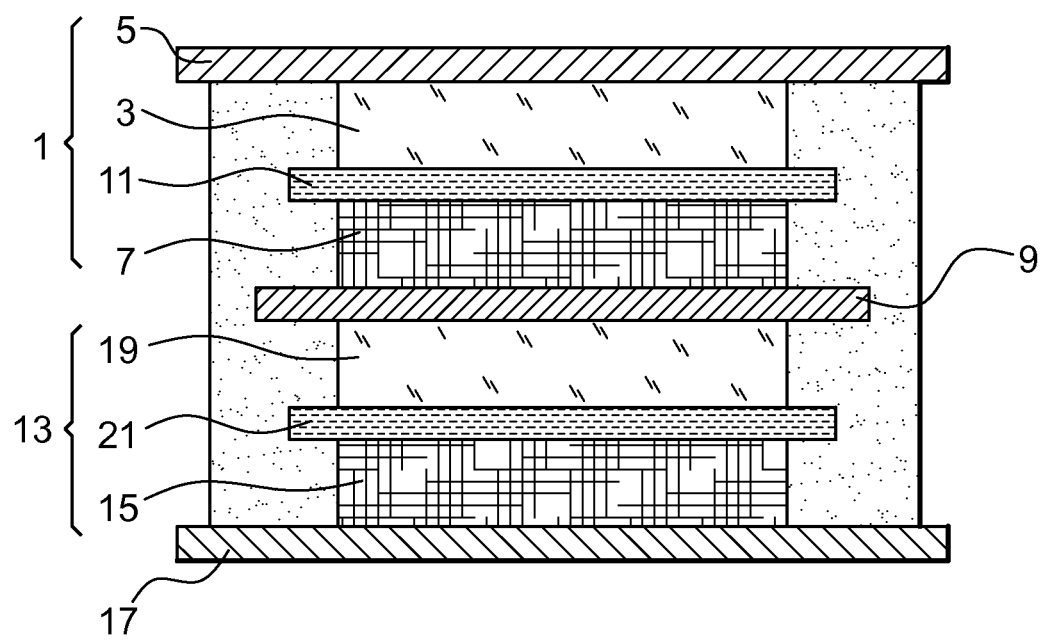

LITHIUM ELECTROCHEMICAL ACCUMULATOR HAVING A SPECIFIC BIPOLAR ARCHITECTURE

CROSS-REFERENCE TO RELATED APPLICATIONS

This application is a U.S. national phase under the provisions of 35 U.S.C. §371 of International Patent Application No. PCT/EP11/59973 filed Jun. 15, 2011, which in turn claims priority of French Patent Application No. 1054818 filed Jun. 17, 2010. The disclosures of such international patent application and French priority patent application are hereby incorporated herein by reference in their respective entireties, for all purposes.

TECHNICAL FIELD

The present invention relates to an lithium electrochemical accumulator with a so-called specific bipolar architecture comprising, as current-collecting substrates between two adjacent cells, substrates in a specific material, which may use a wide panel of positive electrode and negative electrode materials.

The field of the invention may thus be defined as that of energy storage devices, in particular that of electrochemical accumulators.

STATE OF THE PRIOR ART

Energy storage devices are conventionally electrochemical accumulators operating on the principle of electrochemical cells capable of delivering electric current by the presence in each of them of a pair of electrodes (an anode and a cathode, respectively) separated by an electrolyte, the electrodes comprising specific materials capable of reacting according to an oxidation-reduction reaction, in return for which there is production of electrons at the origin of the electric current and production of ions which will circulate from one electrode to the other via an electrolyte.

Accumulators subscribing to this principle, the most used presently, are the following:
  Ni-MH accumulators using metal hydride and nickel oxyhydroxide as electrode materials;
  Ni—Cd accumulators using cadmium and nickel oxyhydroxide as electrode materials;
  lead-acid accumulators using lead and lead oxide $PbO_2$ as electrode materials;
  Li-ion accumulators conventionally using totally or partly lithiated materials as electrode materials.

Over the past few years, Li-ion accumulators have widely supplanted the other accumulators mentioned above because of the continuous improvement in the performances of Li-ion accumulators in terms of energy density. Indeed, lithium ion accumulators give the possibility of obtaining mass and volume energy densities (which may be greater than 180 $Wh \cdot kg^{-1}$) significantly greater than those of Ni-MH and Ni—Cd accumulators (which may range from 50 to 100 $Wh \cdot kg^{-1}$) and lead-acid accumulators (which may range from 30 to 35 $Wh \cdot kg^{-1}$). Furthermore, Li-ion accumulators may have a rated cell voltage above that of the other accumulators (for example, a rated voltage of the order of 3.6V for a cell applying as electrode materials the $LiCoO_2$/graphite pair versus a rated voltage of the order of 1.5V for the other aforementioned accumulators).

Because of their intrinsic properties, Li-ion accumulators therefore prove to be of particular interest for the fields where self-containment is a primordial criterion, such as this is the case for the fields of computer, video, telephone technology, transportation such as electric vehicles, hybrid vehicles or further the medical, space, microelectronics fields.

From a functional point of view, lithium-ion accumulators operate on the principle of intercalation-deintercalation of lithium within the constitutive electrodes of the electrochemical cells of the accumulator.

More specifically, the reaction at the origin of the production of current (i.e. when the accumulator is in a discharge mode) sets into play the transfer, via an electrolyte conducting lithium ions, of lithium cations from a negative electrode which will be intercalated into the acceptor lattice of the positive electrode, while electrons from the reaction at the negative electrodes will supply the outer circuit to which are connected the positive and negative electrodes.

For this type of accumulator, the idea appeared of making an accumulator comprising a plurality of electrochemical cells mounted in series in order to increase the overall voltage of the accumulator, while trying to limit the mass and the volume of the latter.

A suitable architecture for putting electrochemical cells in series, without interfering with the mass and the volume of the resulting accumulator, is the so-called <<bipolar>> architecture, consisting of stacking several electrochemical cells separated from each other by a current-collecting substrate, one face of this substrate being occupied by an electrode of a cell while the opposite face of this substrate is occupied by an electrode of opposite sign of an adjacent cell. This type of architecture allows reduction in the electrical resistance of the assembly as compared with one accumulator, which would consist of a plurality of cells connected together through external connectors.

This bipolar architecture also allows limitation of the unnecessary masses and volumes.

However, this type of architecture imposes that the positive electrode and negative electrode materials be compatible with the material of the aforementioned current-collecting substrate, i.e. that the electrode materials do not have to be capable of forming an alloy with the material of the current-collecting substrate, during operation of the accumulator.

The authors of the present invention thus set the goal of proposing accumulators with a bipolar architecture comprising current-collecting substrates separating the adjacent cells of the accumulator in a material such that it allows the use of a wide panel of positive and negative electrode materials, without compatibility problems being posed.

DISCUSSION OF THE INVENTION

The authors of the present invention surprisingly discovered that by using copper or a copper alloy for forming said current-collecting substrates, it is possible to use a wide panel of positive and negative electrode materials.

Thus, the invention relates to an lithium electrochemical accumulator comprising at least one first electrochemical cell and at least one second electrochemical cell separated from each other by a current-collecting substrate, which substrate supports on a first face, an electrode of said first electrochemical cell and on a second face opposite to said first face, an electrode of said second electrochemical cell, each cell comprising a positive electrode and a negative electrode separated by an electrolyte, characterized in that:
  said current-collecting substrate is in copper or in copper alloy;

the negative electrode may comprise a material selected from:
  metal oxide compounds of formula $M_xO_y$ with M representing an element selected from Ti, Cr, Mn, Fe, Co, Ni, Cu, Mo, W and mixtures thereof, x and y being positive integers selected so that the total charge of the cations compensates for the total charge of the anions, so that the compound is electrically neutral;
  the lithium metal or an alloy comprising lithium metal;
  tin metal; and
  mixtures thereof; and
the positive electrode may comprise a material selected from:
  elemental sulfur;
  sulfide compounds;
  and mixtures thereof.

Before entering the discussion of this invention in more detail, we specify the following definitions.

By positive electrode is conventionally meant, in the foregoing and in the following, the electrode which acts as a cathode, when the generator outputs current (i.e. when it is in a discharge process) and which acts as an anode when the generator is in a charging process.

By negative electrode is conventionally meant, in the foregoing and in the following, the electrode which acts as an anode, when the generator outputs current (i.e. when it is in a discharge process) and which acts as a cathode, when the generator is in a charging process.

The positive electrode may comprise a material selected from:
  transition metal oxides possibly lithiated;
  molybdates, silicates, sulfates, germanates and niobates of transition metals, possibly lithiated;
  transition metal phosphates;
  elemental sulfur;
  sulfide compounds;
  and mixtures thereof.

Advantageously, the positive electrodes may comprise a material selected from elemental sulfur and sulfide compounds.

By elemental sulfur, it is specified that this means the sulfur element not combined with one or several chemical elements.

As examples of possibly lithiated, transition metal oxides, mention may be made of titanium and lithium mixed oxides, such as $Li_4Ti_5O_{12}$, vanadium and lithium mixed oxides such as $LiV_3O_8$ or vanadium oxides such as $V_2O_5$.

As examples of possibly lithiated, transition metal molybdates, mention may be made of iron molybdates, such as $Fe_2(MoO_4)_3$.

As examples of possibly lithiated, transition metal phosphates, mention may be made of $FePO_4$.

As sulfide compounds, mention may be made of:
  lithium polysulfides of general formula $Li_2S_n$, with n being an integer ranging from 2 to 8;
  organic polysulfides of formula $R_2S_n$ with R corresponding to an alkyl group, for example an alkyl group comprising from 2 to 6 carbon atoms, or to an aryl group and n being an integer ranging from 2 to 8;
  organosulfur compounds of the poly(carbon disulfide) type of formula $(CS_2)_n$ with n being an integer ranging from 2 to 8.

According to the invention, the negative electrode may comprise a material selected from:
  metal oxide compounds of formula $M_xO_y$ with M representing an element selected from Ti, Cr, Mn, Fe, Co, Ni, Cu, Mo, W and mixtures thereof, x and y being positive integers selected so that the total charge of the cations compensates for the total charge of the anions, so that the compound is electrically neutral;
  carbonaceous materials, such as carbon;
  lithium metal or an alloy comprising lithium metal;
  tin metal; and
  mixtures thereof.

By lithium metal, is meant the lithium element not combined with one or several chemical elements.

By alloy comprising lithium metal, is meant a mixture comprising lithium metal combined with another element, such as Al, Si, Sn, C (for example $LiC_6$).

By tin metal is meant the tin element not combined with one or several chemical elements.

As examples of compounds of formula $M_xO_y$, mention may be made of TiO, $TiO_2$, $Ti_2O_3$, $Ti_3O_5$, $CrO_2$, $CrO_3$, $Cr_2O_3$, MnO, $MnO_2$, $Mn_2O_3$, $Mn_3O_4$, FeO, $Fe_2O_3$, $Fe_3O_4$, CoO, $Co_3O_4$, NiO, $Cu_2O$, CuO, $MoO_2$, $MoO_3$, $Mo_4O_{11}$, $Mo_9O_{26}$, $WO_2$, $WO_3$.

It is meant that the negative electrode material should be different from the positive electrode material.

According to a particularly preferred embodiment of the invention, the positive electrode comprises elemental sulfur and the negative electrode comprises lithium metal or an alloy comprising lithium metal.

Accumulators including such a pair of electrodes in their electrochemical cells have the following advantages:
  they give the possibility of attaining very large energy densities, which may be greater than 300 Wh·kg$^{-1}$ and an overall accumulator voltage adapted to the targeted application by acting on the number of constitutive electrochemical cells of the accumulator;
  they have, because of the structure of the electrodes, an intrinsic protection system for the electrochemical cells against overcharging.

As regards the first aforementioned advantage, by stacking the suitable number of electrochemical cells, it is thereby possible to obtain an overall accumulator voltage (for example 240 V) and a very large energy density (for example of the order of 400 Wh·kg$^{-1}$), the number of cells to be stacked in order to obtain a given energy density, being less than for the systems of the prior art such as those operating with the $LiFePO_4/Li_4Ti_5O_{12}$ electrode pair (for which the energy density is exclusively close to 60 Wh·kg$^{-1}$), which may reduce the mass of the accumulator. The accumulators of the invention may thus be particularly of interest for fields of application such as the field of electric vehicles.

As regards the second aforementioned advantage, the latter results from the fact that the constitutive sulfur of the positive electrode is capable of ensuring an intrinsic protection mechanism against overcharging phenomena, because sulfur is able during the charging processes to generate compounds of the lithium polysulfide type, notably fitting formula $Li_2S_n$, with n which may range from 2 to 8.

This compound, once it is formed, will ensure, in the electrolyte, the role of a redox shuttle, which means, in other words, that this compound will undergo at a determined potential an oxidation at one of the electrodes of this cell in order to give an oxidized form of this compound, this oxidized form in turn undergoing reduction at the electrode of opposite sign of the same cell in order to give a reduced form, this reduced form then being capable of being oxidized at the electrode of reverse polarity. At the aforementioned determined potential, an equilibrium is set into place, causing consumption of the compound at one electrode and its regeneration at the electrode of opposite sign (whence the name of redox shuttle). As these reactions occur at constant potential, this phenomenon of consumption/regeneration of this compound causes a stabilization of the cell voltage, as soon as this mechanism is set into place.

More specifically, this redox shuttle mechanism occurs at a potential located between 2.4 and 2.5 V (this potential being expressed relatively to the $Li^+/Li$ potential), which means that the cell voltage, during the charging process is stabilized at this potential, and this regardless of the elapsed charging time. For this pair of electrodes set into play in the accumulators of the invention, this cell voltage is perfectly tolerable without the latter being detrimental to the integrity of the constitutive elements of the cell.

Indeed, the cell voltage by the action of the compound of the lithium polysulfide type, is stabilized at a value less than a voltage value, for which said cell is in a overcharged state, and this regardless of the charging time, this means that during charging operations, there is no longer any risk that these cells be found in an overcharged condition and consequently in a state degrading the elements of this cell due to this overcharging.

Consequently, due to the stabilization of the cell voltage by the action of the compounds of the lithium polysulfide type, charging of the cells for which the rated voltage is not attained, may be maintained, without this affecting the cells for which charging is completed. Thus the result is, at the end of charging, an accumulator for which each of the cells has the same charge state at the end of a cycle and for which the overall voltage is thus perfectly defined.

Therefore there is no longer any need of using electronic systems for controlling the charging of different constitutive cells of the accumulator, the protection against overcharging phenomena being intrinsic to the structure of the cells and not to external systems. The result of this, as compared with accumulators using control systems, is making the accumulators more lightweight and furthermore is the disappearance of the failure concerns regarding the control system which may occur.

Finally, the action of the compound of the lithium polysulfide type may also be efficient, when, at least one of the electrochemical cells of the accumulator is characterized by a failure which is materialized by an increase in the cell voltage without any actual recharging of the electrodes, which would be detrimental to the surrounding cells. With the lithium polysulfide type compounds according to the invention, the cell voltage of faulty cells is stabilized to a value conventionally ranging from 2.4 to 2.5V (which corresponds to the potential, at which is set into place the redox shuttle mechanism of the additive), the other non-faulty cells may continue to be charged.

As mentioned above, the current collecting substrate supports on a first face an electrode of said first electrochemical cell and, on a second face opposite to said first face, an electrode of opposite sign of said second electrochemical cell, which means in other words that the current-collecting substrate supports on a first face, a positive electrode of said first electrochemical cell, and on a second face opposite to said first face, a negative electrode of said second electrochemical cell or vice versa.

In the scenario of the accumulators of the invention, it is thus required that the constitutive material of the current-collecting substrate be stable both towards elemental sulfur entering the composition of the positive electrode and to lithium metal entering the composition of the negative electrode.

A current-collecting substrate according to the invention based on copper or copper alloy meets the aforementioned stability conditions.

By means of the pair of constitutive electrodes of the electrochemical cells of the accumulators of the invention, it is not necessary to resort to current-collecting substrates of complex structure, such as this may be the case of accumulators with a bipolar architecture from the prior art, wherein, for reasons of stability towards the electrode materials, the current-collecting substrate has a two-face structure, wherein each face consists of a material distinct from that of the other face.

The electrolyte is preferably a liquid electrolyte comprising a lithium salt.

Thus, for example, the liquid electrolyte may include a solvent or a mixture of solvents of the carbonate type, such as ethylene carbonate, propylene carbonate, dimethyl carbonate or diethyl carbonate, and/or a solvent or mixture of solvents of the ether type, such as dimethoxyethane, dioxolane, dioxane, tetraethylene glycol dimethyl ether (known under the acronym TEGDME) and mixtures thereof in which a lithium salt is dissolved.

As examples, the lithium salt may be selected from the group formed by $LiPF_6$, $LiClO_4$, $LiBF_4$, $LiAsF_6$, $LiCF_3SO_3$, $LiN(CF_3SO_2)_3$, $LiN(C_2F_5SO_2)$, lithium bistrifluoromethylsulfonylimide (known under the acronym of LiTFSI) LiN$[SO_2CF_3]_2$ and mixtures thereof.

The use of a liquid electrolyte advantageously gives the possibility of ensuring good diffusion of the lithium polysulfide additive from one electrode to the other and thus an efficient protection against cell overcharging, even in the case of high charging rates.

The aforementioned liquid electrolyte may be lead, in the electrochemical cells of the accumulators of the invention, to impregnate a separator, which is positioned between the positive electrode and the negative electrode of the electrochemical cell.

This separator may be in a porous material, such as a polymeric material, able to receive in its porosity the liquid electrolyte.

As an example, the polymer may comprise poly(acrylonitrile), poly(ethylene oxide), poly(vinylidene fluoride), a copolymer of vinylidene fluoride-hexafluoropropylene or another polymer made ion-conductive by gelling in the presence of a liquid electrolyte. The lithium salt may fit the same definition as the one given earlier.

When the first cell and/or the second cell is located at the end of the accumulator (i.e. it forms the cell located at the end of the stack), this first and/or second cell contains, in addition to an electrode deposited on a face of a current-collecting substrate, the opposite face of which is occupied by an electrode of opposite sign of the adjacent cell, an electrode of opposite sign deposited on a first face of a current-collecting substrate, the face opposite to said first face not being occupied by an electrode of an adjacent cell, considering that said first cell and/or the second cell forms the last cell of the stack. The current-collecting substrate, a single face of which is occupied by an electrode may also advantageously be in copper or a copper alloy, but may also be in another metal or metal alloy.

The accumulators according to the invention are particularly suitable for products requiring compact integration architectures (such as in onboard systems, standalone systems, where significant energy is required. This type of requirement may be encountered in the fields of products requiring an autonomous power supply, which is the case of the fields of computer, video, telephone technology transportation such as electric vehicles, hybrid vehicles or further medical, space, microelectronics fields.

The invention will now be described with reference to the particular embodiment defined below with reference to the appended figures.

SHORT DESCRIPTION OF THE DRAWINGS

The single FIGURE illustrates an accumulator according to the invention in accordance with a particular embodiment.

DETAILED DISCUSSION OF PARTICULAR EMBODIMENTS

The example shown below illustrates the preparation of an accumulator according to the invention illustrated in the single figure as an appendix, this accumulator consisting of a stack of a first electrochemical cell and of a second electrochemical cell separated by a current-collecting substrate in copper, said to be <<bipolar>>, each cell respectively comprising a positive electrode comprising elemental sulfur and a negative electrode comprising lithium metal separated by an electrolyte.

1) Making the Positive Electrode a So-Called <<Peripheral Positive Electrode>>

A positive electrode of the following composition:
80% by mass of elemental sulfur;
10% by mass of super P carbon black;
10% by mass of polyvinylidene fluoride (PVDF)
is prepared according to the following procedure:
weighing the elemental sulfur and carbon black powders separately;
preparing a solution of N-methyl-pyrrolidone (NMP) comprising the PVDF;
gradually adding into said solution the aforementioned powders while proceeding with mixing by mechanical stirring;
after obtaining a homogeneous mixture, coating by means of a micrometric doctor blade, one face of a copper sheet with a thickness of 20 μm, with said mixture in order to obtain a layer having a thickness of 100 μm;
first drying of the thereby deposited layer in an oven at 55° C. for 24 hours, so as to obtain evaporation of NMP;
second drying of the layer at 50° C. for 48 hours, in order to remove all traces of residual water, in return for which the resulting layer forms the positive electrode, this layer having a thickness of 15 μm.

2) Making the Negative Electrode a So-Called <<Peripheral Negative Electrode>>.

The peripheral negative electrode is made by hot rolling a sheet of lithium metal with a thickness of 135 μm on a copper sheet acting as a current-collecting substrate.

3) Making the Substrate, a So-Called <<Bipolar Substrate>>

The bipolar substrate is made by applying the operating procedure discussed in paragraph 1) above, on a first face of a copper sheet with a thickness of 20 μm and the operating procedure discussed in paragraph 2) above, on a second face of the same sheet, this second face being opposite to said first face.

4) Making the Stack

The accumulator illustrated in FIG. 1 is made in two steps.

A first step, carried out under a non-controlled atmosphere, consists of placing, according to a configuration compliant with the one illustrated in FIG. 1, the peripheral positive electrode, the bipolar substrate and the peripheral negative electrode in two U-shaped polyethylene gaskets, leaving one face of the generator open, followed by a hot compression step for the assembly so as to ensure the seal of the accumulator.

A second step, carried out in an inert atmosphere, consists of introducing through the open face, in both cells between the positive electrode and the negative electrode, a polypropylene/polyethylene separator impregnated with a liquid electrolyte based on lithium bis-trimethylsulfonylimide (1 mol·L$^{-1}$) in solution in a 50/50 mixture by volume of tetraethylene glycol dimethyl ether (TEGDME)/dioxolane.

The open face is then closed by means of the two other gaskets in polyethylene.

At the end of these different steps, an electrochemical lithium accumulator is obtained, according to what is illustrated in the single FIGURE, comprising:
a first electrochemical cell 1 comprising a peripheral positive electrode 3 comprising elemental sulfur deposited on a conducting copper substrate 5 and, facing it, a negative electrode 7 comprising lithium metal deposited on a first face of a conducting copper substrate 9, said negative electrode and said positive electrode being separated from each other by a separator 11 impregnated with an electrolyte as defined above; and
a second electrochemical cell 13 comprising a peripheral negative electrode 15 comprising lithium metal deposited on a conducting copper substrate 17 and, facing it, a positive electrode 19 comprising elemental sulfur deposited on a second face of said conducting copper substrate 9, said second face being opposite to said first face, said negative electrode and said positive electrode being separated from each other by a separator 21 impregnated with an electrolyte as defined above.

The invention claimed is:

1. A lithium electrochemical accumulator comprising bipolar architecture comprising at least one first electrochemical cell and at least one second electrochemical cell separated from each other by a current-collecting substrate, which current-collecting substrate supports on a first face an electrode of said first electrochemical cell and on a second face opposite to said first face, an electrode of opposite sign of said second electrochemical cell, each electrochemical cell comprising a positive electrode and a negative electrode separated by an electrolyte, wherein:
said current-collecting substrate is an integral copper or copper alloy substrate wherein the copper or copper alloy is in contact with each of the electrode supported on the first face and the electrode supported on the second face;
the negative electrode comprises a material selected from:
metal oxide compounds of formula $M_xO_y$ with M representing an element selected from Ti, Cr, Mn, Fe, Co, Ni, Cu, Mo, W and mixtures thereof, x and y being positive integers selected so that the total charge of the cations compensates for the total charge of the anions so that the compound is electrically neutral;
lithium metal or an alloy comprising lithium metal;
tin metal; and
mixtures thereof; and
the positive electrode comprises a material selected from:
elemental sulfur;
sulfide compounds;
and mixtures thereof.

2. The accumulator according to claim 1, wherein:
the positive electrode comprises elemental sulfur; and
the negative electrode comprises lithium metal or an alloy comprising lithium metal.

3. The accumulator according to claim 1, wherein the electrolyte is a liquid electrolyte comprising a lithium salt.

4. The accumulator according to claim 3, wherein the lithium salt is selected from $LiPF_6$, $LiClO_4$, $LiBF_4$, $LiAsF_6$, $LiCF_3SO_3$, $LiN(CF_3SO_2)_3$, $LiN(C_2F_5SO_2)$, lithium bistrifluoromethylsulfonylimide $LiN[SO_2CF_3]_2$ and mixtures thereof.

5. The accumulator according to claim 3, wherein the electrolyte comprises one or more solvents from the family of carbonates and/or from the family of ethers.

6. The accumulator according to claim 2, wherein the electrolyte is a liquid electrolyte comprising a lithium salt.

7. The accumulator according to claim 6, wherein the electrolyte comprises one or more solvents from the family of carbonates and/or from the family of ethers.

8. The accumulator according to claim 2, wherein the negative electrode comprises lithium metal.

9. The accumulator according to claim 2, wherein the negative electrode comprises an alloy comprising lithium metal.

10. The accumulator according to claim 1, wherein the current-collecting substrate consists of copper.

11. The accumulator according to claim 10, wherein:
the positive electrode comprises elemental sulfur; and
the negative electrode comprises lithium metal or an alloy comprising lithium metal.

12. The accumulator according to claim 10, wherein the electrolyte is a liquid electrolyte comprising a lithium salt.

13. The accumulator according to claim 11, wherein the negative electrode comprises lithium metal.

14. The accumulator according to claim 11, wherein the negative electrode comprises an alloy comprising lithium metal.

15. The accumulator according to claim 1, wherein the current-collecting substrate consists of copper alloy.

16. The accumulator according to claim 15, wherein:
the positive electrode comprises elemental sulfur; and
the negative electrode comprises lithium metal or an alloy comprising lithium metal.

17. The accumulator according to claim 15, wherein the electrolyte is a liquid electrolyte comprising a lithium salt.

18. The accumulator according to claim 16, wherein the negative electrode comprises lithium metal.

19. The accumulator according to claim 16, wherein the negative electrode comprises an alloy comprising lithium metal.

* * * * *